Jan. 23, 1934.    D. J. STEWART    1,944,699
AIR CONDITIONING SYSTEM
Filed May 26, 1930    2 Sheets-Sheet 1
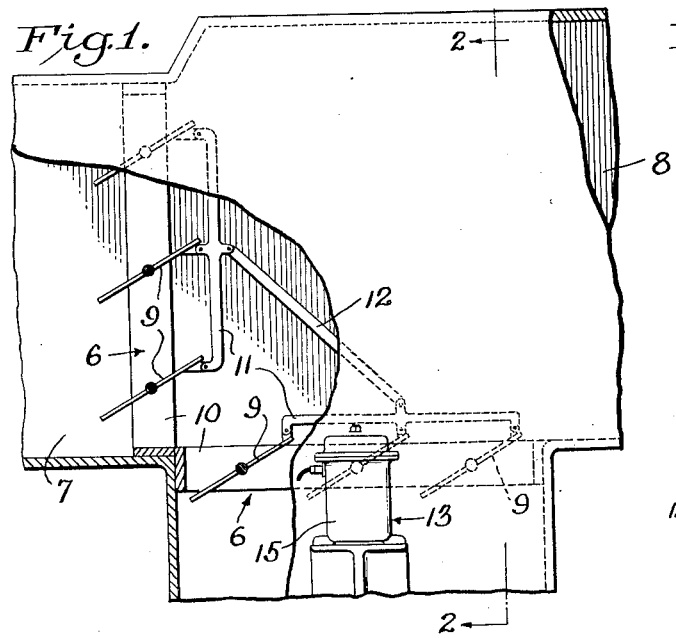
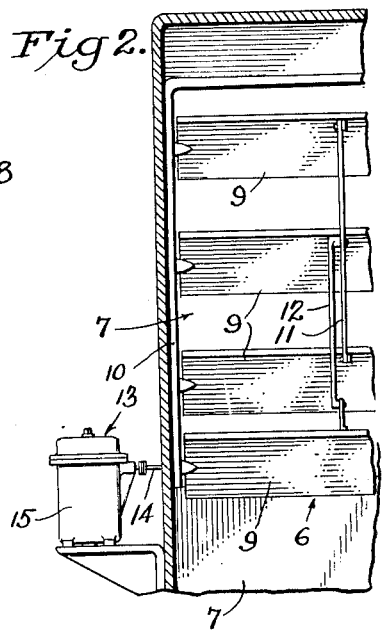
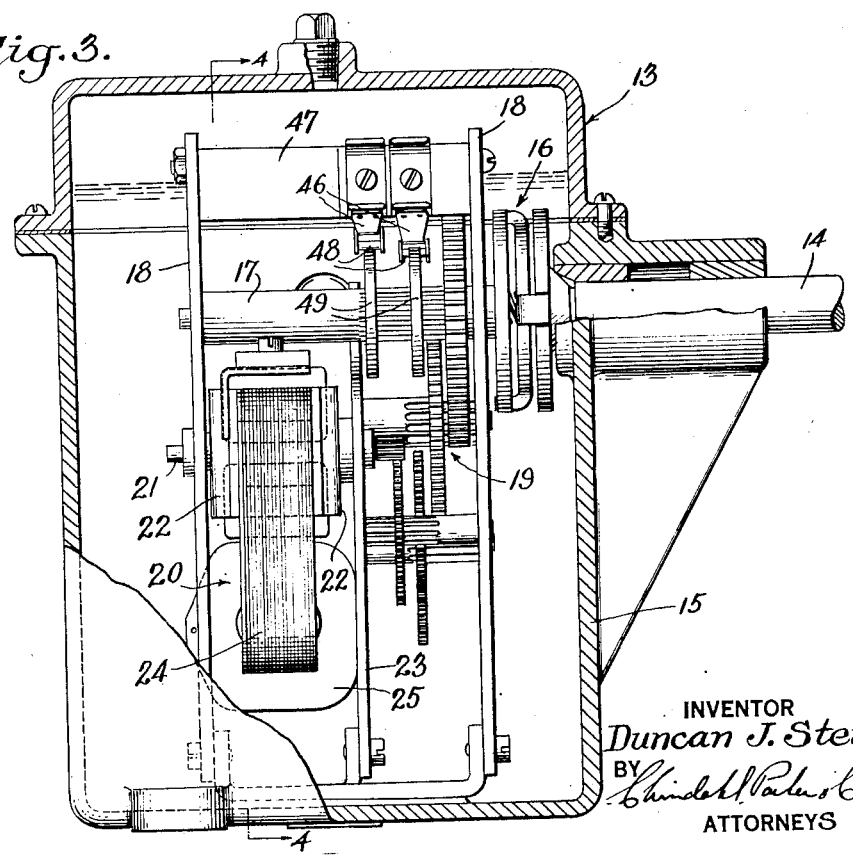
INVENTOR
Duncan J. Stewart
BY
ATTORNEYS Jan. 23, 1934.　　　　D. J. STEWART　　　　1,944,699
AIR CONDITIONING SYSTEM
Filed May 26, 1930　　　2 Sheets-Sheet 2

AC SUPPLY

INVENTOR
Duncan J. Stewart
BY
ATTORNEYS

Patented Jan. 23, 1934

1,944,699

UNITED STATES PATENT OFFICE 1,944,699

AIR CONDITIONING SYSTEM

Duncan J. Stewart, Rockford, Ill., assignor to Howard D. Colman, Rockford, Ill.

Application May 26, 1930. Serial No. 455,787

2 Claims. (Cl. 236—74)

The invention pertains to air conditioning systems of the type embodying an electrically driven regulating device such as a valve or damper operator, and has especial reference to a system in which the regulating device is controlled automatically by a sensitive instrumentality such as a thermostat, a humidostat, or the like.

The object of the present invention is to provide a temperature control system in which a heat regulating device is driven by an electric motor arranged to be thermostatically controlled in a novel manner such as to permit the use of a thermostat switch of the open contact type.

Other objects and advantages of the invention will become apparent from the following detailed description taken in connection with the accompanying drawings, in which Figure 1 is a fragmentary view of valves arranged to be controlled by an operator embodying the features of the present invention.

Fig. 2 is a sectional view taken along the line 2—2 of Fig. 1.

Fig. 3 is a vertical sectional view of the valve operator.

Figure 4:
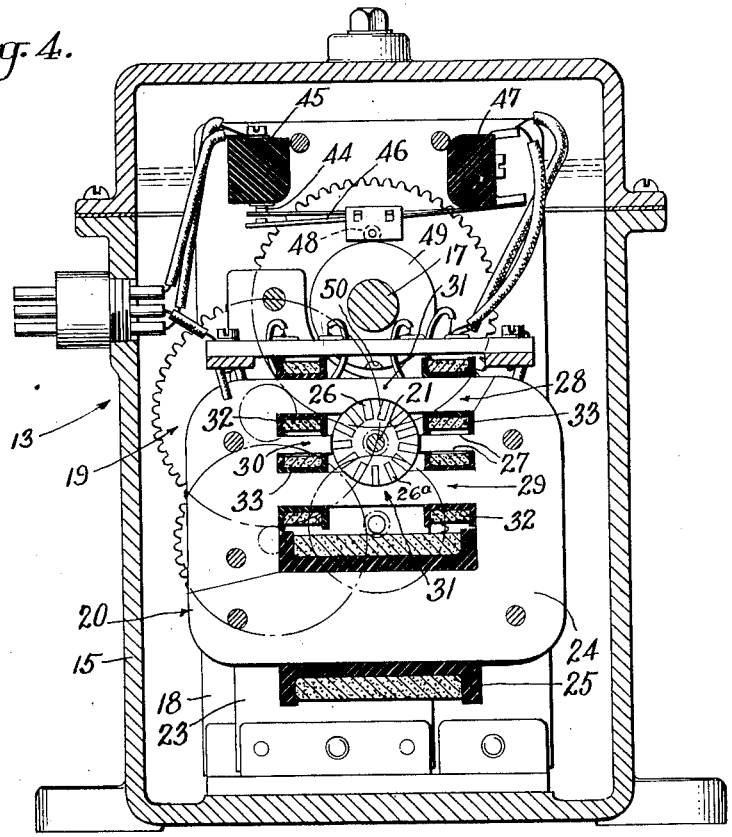
Fig. 4 is a sectional view taken along the line 4—4 of Fig. 3.
Figure 5:
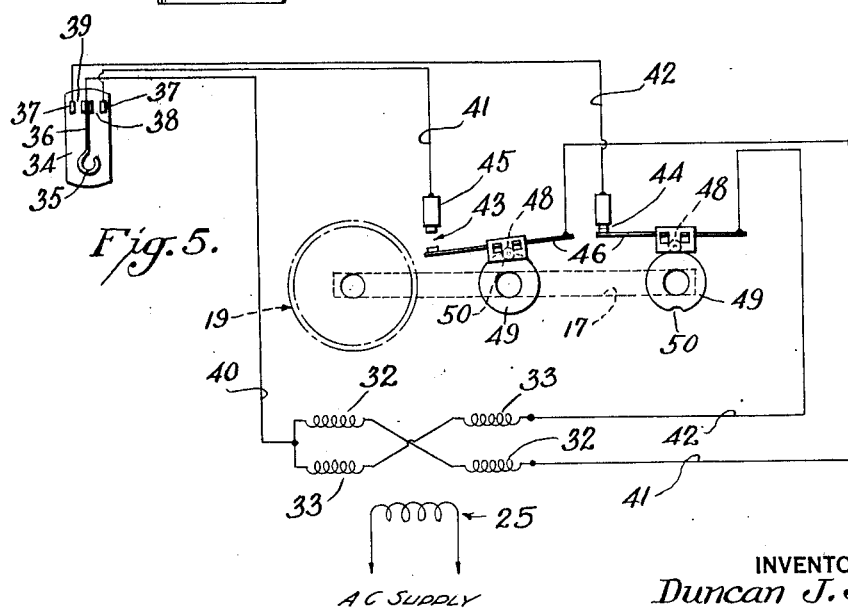
Fig. 5 is a schematic view and wiring diagram of the control parts of the mechanism by which the operator is controlled.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, I have shown an air conditioning system having an electrically driven regulating device in the form of a damper. Two interconnected dampers 6 are shown in the drawings arranged in warm and cool air ducts 7 which discharge into a common conduit 8.

Each of the dampers 6 comprises a plurality of vanes 9 journaled on central end trunnions in a frame 10. To move the vanes of each damper in unison, one edge of each is pivoted to a bar 11 which is connected by a link 12 to the bar of the other damper. The proportion of warm and cold air delivered to the conduit 8 may be varied by shifting the link 12 in opposite directions between two limiting positions, in one of which the warm air duct is completely open and the cold air duct closed, and in the other of which the warm air duct is closed and the cold air duct is open.

In the present instance, the operator, designated generally by the numeral 13, is connected to one valve through the medium of a rotary actuator in the form of a shaft 14 which projects from an oil tight casing 15 in which the operator proper is mounted. The shaft 14 may be connected directly to an extended end trunnion of one of the damper vanes 9 so that one damper may be closed and the other opened by turning the shaft through a quarter revolution.

Within the casing 15, the shaft 14 is connected through a universal coupling 16 to the main drive shaft 17 of the operator which is journaled in the upper ends of two spaced standards 18 constituting the operator frame and upstanding from the bottom of the casing. To effect a slow and graduated movement of the dampers, the shaft 17 is arranged to be driven from a train of spur gears 19 capable of producing a comparatively large reduction in the speed of an electric motor 20 of the type disclosed and claimed in the copending application of Edgar D. Lilja, Serial No. 540,643, filed May 28, 1931. The driving shaft 21 of this motor is journaled at opposite ends in brackets 22 secured to one standard 18 and an intermediate standard 23. The gear train and motor are thus located on opposite sides of the frame beneath the main shaft, all of these parts being immersed in oil contained in the casing 15.

The motor 20 is of the induction type having a flat laminated stator 24 of the core type and of generally rectangular shape supported from the frame through the medium of the brackets 22. One leg of the stator is enclosed by a winding 25 which, when energized from a source of alternating current, creates a magnetic flux which threads the substantially closed magnetic circuit through the stator. The other leg of the stator is formed with a cylindrical recess in which is disposed a cylindrical rotor 26 of the squirrel cage type rigid with the motor shaft 21. In the present instance, the inductor bars 26ᵃ of the rotor are exposed at the surface of the iron core so that there is no continuous iron circuit around the individual inductor bars. The rotor therefore possesses a low reactance which contributes to the desirable poor single phase characteristics of the motor.

The portions of the stator on opposite sides of the rotor constitute the stator poles and each is formed with two parallel slots 27 which divide the pole into outer, inner and intermediate projections 28, 29 and 30. Preferably the projections 28 and 29 of the opposite poles are connected by bridges 31 which enclose that portion of the rotor surface between the poles and enlarge the amount of effective iron of the rotor to which the magnetic field is distributed.

Starting of the motor is effected by the action of auxiliary windings commonly known as short-circuited or shading coils which enclose one side portion of the magnetic pole and produce a shifting field across the pole face as is well understood in the art. In the present instance, there are two of these shading coils on each pole mounted adjacent the rotor recess. The coils for the opposite poles are arranged in pairs and enclose the inner and outer projections 28 and 29 on diametrically opposite sides of the rotor. The coils of each set are connected in series and are designated by the numerals 32 and 33 respectively.

Through the use of two shading coils on each pole, one side or the other of the pole face can be shaded by rendering the coils operative selectively thereby causing the motor to rotate in either direction. Thus when only the coils 32 are short-circuited with the winding 25 energized, the current induced in these coils by the flux threading therethrough creates a flux which reacts with the main field flux to cause the flux threading the enclosed projections to lag that in the other or unshaded pole areas. In this way, the flux threading the rotor shifts in a clockwise direction as viewed in Fig. 4, thereby causing the rotor to turn in the same direction. Rotation in the reverse direction occurs when the winding 25 is energized with only the coils 33 short-circuited.

Owing to the core type construction of the stator and the low reactance of the rotor, the single phase characteristics inherent in the present motor are so poor that the motor will, of its own accord, cease rotating when the circuits of active shading coils are interrupted while the primary winding 25 continues to remain excited. Thus, the motor is within the complete control of its shading coils and the winding 25 may be excited constantly during operation of the temperature control system. On the other hand, by reason of the special core type construction of its stator, the motor possesses good polyphase characteristics and therefore the proper amount of torque to operate the damper when one set of the shading coils is rendered effectual by short-circuiting the same.

In order that the circuits through the shading coils may be controlled selectively by a sensitive instrumentality located at a point remote from the operator, the coils are constructed in the resistance losses due to the sensitive switches and the use of long conductors in the control circuits are reduced to the proper degree. To accomplish this and at the same time produce the degree of shading required to give the desired motor torque, each shading coil is composed of a relatively large number of turns of wire rather than of a single turn as is the common practice in motors of the shading ring type.

The main winding 25 of the motor is intended to be energized constantly while the valve operator is in use. To this end, its terminals are connected directly to a source of alternating current of suitable voltage.

Inasmuch as the motor above described is arranged to be started and stopped by controlling a circuit in which the power input is relatively low as compared to that of the main motor winding 20, the present operator is particularly adapted for control by sensitive instrumentalities such as thermostats, humidostats, and the like, which may be arranged not only to initiate operation of the motor but also to determine the duration of such operation and therefore the extent of movement of the valve. Herein the two circuits through the shading coils are arranged to be closed selectively by a thermostat 34 of the so-called open switch type which may be positioned to respond to the temperature in the mixed air conduit 8 or to that in a room to which the mixed air is delivered. The thermostat comprises generally a thermal element 35 having a tongue 36 movable between two spaced contacts 37 and cooperating therewith to form switches 38 and 39 which are closed respectively when the temperature rises above or falls below a range predetermined by the spacing of the contacts 37 and the adjustment of the thermal element.

The shading coils 32 and 33 on one pole are joined together and this common terminal is connected by a conductor 40 to the common contact of the thermostat switches. The other terminals of the coils 32 and 33 are connected respectively by conductors 41 and 42 to the stationary contacts of the switches 38 and 39. With this arrangement, the shading coils may be rendered operative and the direction of rotation of the motor thereby determined by the selective operation of the switches 38 and 39. Thus, when the temperature of the air to which the thermostat is exposed rises above the predetermined range, one of the thermostatic switches is closed, thereby completing the circuit through one set of shading coils whereupon the motor will run in a direction to close the warm air damper and open the cold air damper. This movement continues at an extremely low rate under the sole control of the thermostat until the temperature has been reduced sufficiently to open the thermostat switch whereupon the operator will stop. In this way, the thermostat operates entirely automatically to determine the extent of the valve movement as well as to initiate such movement. Movement of the valve in the opposite direction will take place when the other shading coils are rendered operative by closure of the other thermostatic switch as the temperature falls below the predetermined range.

It will be apparent from the foregoing that the dampers may be moved variable distances at frequently recurring intervals without placing an excessive load on the delicate thermostat switches. This is for the reason that the thermostat controls the circuits through the shading coils rather than through the main winding 25 and are required to make and break the circuits at low voltage and current due to the use of shading coils which have a large number of turns in order to reduce the resistance losses and maintain a low current in the circuits.

Means is provided for rendering the energized shading coil ineffectual whereby to interrupt the operation of the motor when the dampers reach either of their limiting positions even through the thermostat switch which initiated the movement to such position remains closed. In the present instance, this means includes switches 43 and 44 in series with the respective shading coils and arranged to be actuated as incidents to movements of the valve to limiting positions. The switches 43 and 44 are interposed respectively in the conductors 41 and 42 and each comprises a stationary contact mounted on an insulating block 45 between the frame standards 18 and the cooperating movable contact on one end of a spring arm 46 whose other end is secured to a block 47.

Intermediate its ends, each arm 46 carries a roller 48 which follows a cam 49 rigid with the shaft 17 and having a notch 50 therein into which the roller drops allowing the associated switch to open when the shaft is in a position corresponding to one limiting position of the valve member. The notches of the two cams are disposed at right angles to each other so that one or the other of the switches 43 and 44 is opened when one damper is closed and the other is open. For all intermediate positions of the shaft 17, both switches 43 and 44 are closed so that the motor may be started in response to the closure of either thermostat switch and the valve thereby moved either toward closed or open position.

By locating the switches 43 and 44 in the circuits of the shading coils, the primary winding 25 continues to remain excited when the damper is at either limiting position and therefore is available for initiating reverse movement of the damper when the other thermostat switch becomes closed. The switch mechanism for limiting the movements of the damper or other device operated by the motor is thereby materially simplified.

It will be observed that I have provided an air conditioning system capable of operating for long periods of service use without loss of sensitivity of the controlling instrumentality due to deterioration by sparking at the switch contacts. Of primary importance in this system is the motor employed. A characteristic of this motor essential to the success of applicant's system is that the electric power consumed in the starting or shading coil circuit, which is roughly proportional to the product of the current and the induced voltage in this circuit, is only a small fraction (between one-tenth and one-twentieth) of the power input of the main winding. The currents are created in the shading coils by electromagnetic induction and merely for the purpose of producing the necessary starting action, and the only power consumed in the shading coil circuit is due to the losses therein whereas the power applied to the main winding must be equal to the sum of the mechanical power delivered by the motor and the power required to supply the iron losses, the rotor losses, the copper losses in the main winding, and the shading coil losses.

The sensitive controlling device, herein the thermostat, is arranged to short-circuit and open-circuit the shading coils only and thus control the motor. To avoid the necessity for controlling the current application to the main field winding by the thermostat switch, said winding is maintained constantly energized by alternating current. By thus utilizing the thermostat switches solely as a means for controlling the shading coil circuit, advantage is taken of the low power character of this circuit and the burden on the contact switches of the thermostat is accordingly reduced, such burden being proportional to the power, not merely the current of the circuit of the circuit controlled thereby.

I claim as my invention:

1. In a temperature control system, the combination of a heat regulating device, an induction motor for actuating said device having a stator with a primary winding thereon constantly excited by alternating current during the operation of said system and producing a magnetic field threading the rotor of said motor, a shading coil composed of a relatively large number of turns and adapted when short-circuited to produce shifting of said magnetic field around said rotor, and a sensitive thermostat having a switch of the open-contact type operated in response to temperature changes and adapted when closed to short-circuit said coil and thereby initiate shifting of said magnetic field and operation of the motor and when opened to interrupt the coil circuit and render the coil ineffectual in producing said shifting.

2. In an air conditioning system, the combination of a regulating device, an induction motor for actuating said device having a stator with a primary winding thereon constantly excited by alternating current during the operation of said system and producing a magnetic field threading the rotor of said motor, a starting coil composed of a relatively large number of turns and having currents induced therein by said magnetic field when the coil is short-circuited whereby to initiate rotation of said rotor, and a sensitive control instrumentality having a switch means of the open contact type operated in response to changes in the condition of the surrounding air and adapted to short-circuit said coil and thereby initiate rotation of said rotor and to interrupt the coil circuit whereby to render the same ineffectual.

DUNCAN J. STEWART.

CERTIFICATE OF CORRECTION.

Patent No. 1,944,699.  January 23, 1934.

DUNCAN J. STEWART.

It is hereby certified that error appears in the printed specification of the above numbered patent requiring correction as follows: Page 2, line 61, after "in" insert the words a manner such that; and that the said Letters Patent should be read with this correction therein that the same may conform to the record of the case in the Patent Office.

Signed and sealed this 15th day of May, A. D. 1934.

Bryan M. Battey (Seal)   Acting Commissioner of Patents.